United States Patent
Choi et al.

(10) Patent No.: US 8,738,569 B1
(45) Date of Patent: May 27, 2014

(54) SYSTEMATIC VERIFICATION OF DATABASE METADATA UPGRADE

(75) Inventors: King Lun Choi, Palo Alto, CA (US);
Caleb E. Welton, Foster City, CA (US);
Jeffrey Ira Cohen, Sunnyvale, CA (US);
Gavin Sherry, Beaune (FR)

(73) Assignee: EMC Corporation, Hopkinton, MA (US)

( * ) Notice: Subject to any disclaimer, the term of this patent is extended or adjusted under 35 U.S.C. 154(b) by 66 days.

(21) Appl. No.: 13/371,337

(22) Filed: Feb. 10, 2012

(51) Int. Cl.
*G06F 17/00* (2006.01)

(52) U.S. Cl.
USPC ............................................. 707/619

(58) Field of Classification Search
None
See application file for complete search history.

(56) References Cited

U.S. PATENT DOCUMENTS

| | | | | |
|---|---|---|---|---|
| 5,613,111 A * | 3/1997 | Malatesta et al. | ...................... | 1/1 |
| 5,649,089 A * | 7/1997 | Kilner | ............................. | 714/6.3 |
| 5,717,924 A * | 2/1998 | Kawai | .................................. | 1/1 |
| 6,081,811 A * | 6/2000 | Nilsson | ................................. | 1/1 |
| 6,115,704 A * | 9/2000 | Olson et al. | ............................ | 1/1 |
| 7,610,298 B2 * | 10/2009 | Zaytsev et al. | ........................ | 1/1 |
| 8,473,484 B2 * | 6/2013 | Egan et al. | ..................... | 707/718 |
| 2003/0084073 A1 * | 5/2003 | Hotti et al. | .................... | 707/201 |
| 2003/0212789 A1 * | 11/2003 | Hamel et al. | .................. | 709/225 |
| 2004/0024736 A1 * | 2/2004 | Sakamoto et al. | ................ | 707/1 |
| 2004/0210606 A1 * | 10/2004 | Brown et al. | ................. | 707/203 |
| 2004/0225696 A1 * | 11/2004 | Wong et al. | .................... | 707/203 |
| 2005/0154695 A1 * | 7/2005 | Gonzalez et al. | ................. | 707/1 |
| 2006/0080656 A1 * | 4/2006 | Cain et al. | ..................... | 717/174 |
| 2006/0129542 A1 * | 6/2006 | Hinshaw et al. | .................. | 707/3 |
| 2006/0161558 A1 * | 7/2006 | Tamma et al. | ................. | 707/100 |
| 2007/0288534 A1 * | 12/2007 | Zak et al. | ........................ | 707/204 |
| 2008/0077632 A1 * | 3/2008 | Tysowski et al. | ............. | 707/204 |
| 2008/0154918 A1 * | 6/2008 | Iwatsu et al. | ..................... | 707/100 |
| 2008/0195673 A1 * | 8/2008 | Hamel et al. | .................. | 707/202 |
| 2008/0270443 A1 * | 10/2008 | Murray | ......................... | 707/101 |
| 2009/0132475 A1 * | 5/2009 | Hinshaw et al. | ................... | 707/2 |
| 2009/0164427 A1 * | 6/2009 | Shields et al. | ..................... | 707/3 |
| 2009/0198790 A1 * | 8/2009 | Grevers, Jr. | ................... | 709/213 |
| 2011/0213759 A1 * | 9/2011 | Zazrivec et al. | .............. | 707/695 |
| 2011/0295876 A1 * | 12/2011 | Zazrivec et al. | .............. | 707/769 |
| 2012/0109906 A1 * | 5/2012 | Wagner | ......................... | 707/690 |
| 2012/0191717 A1 * | 7/2012 | Chen et al. | ..................... | 707/740 |
| 2013/0117307 A1 * | 5/2013 | Vishnoi et al. | ................ | 707/770 |

OTHER PUBLICATIONS

Hercule et al., Study of the Master-Slave replication in a distributed database, IJCSI Int'l Journal of Comp. Sci. Issues, vol. 8, Issue 5, No. 3, Sep. 2011, ISSN: 1694-0814, retrieved on Jun. 21, 2013, retrieved from the Internet. <URL: http://ijcsi.org/papers/IJCSI-8-5-3-319-326.pdf>.*

IBM Informix, Documentation Notes for the IBM Informix Enterprise ReplicationGuide, Version 10.00.xC10 Feb. 2009, retrieved on Jun. 21, 2013, retrieved from the Internet <URL: http://publib.boulder.ibm.com/infocenter/idshelp/v10/index.jsp?topic=/com.ibm.docnotes.doc/xc10/ids_erep_docnotes_10.0.html>.*

* cited by examiner

*Primary Examiner* — Neveen Abel Jalil
*Assistant Examiner* — Tyler Torgrimson
(74) *Attorney, Agent, or Firm* — Barry N. Young

(57) ABSTRACT

A script is run on a database to transform the metadata and produce an upgraded database. A new database corresponding to the upgraded database is initialized, and the metadata in the new database catalog is verified by comparing it to the upgraded database metadata. A fast verification is performed on a partial upgrade by dumping the catalogs of master nodes and comparing the results, and a thorough verification is performed on a full upgrade by querying and comparing both master node catalogs and segment node catalogs.

10 Claims, 7 Drawing Sheets

SYSTEMATIC VERIFICATION OF DATABASE METADATA UPGRADE

BACKGROUND

This invention relates generally to methods for upgrading database systems, and more particularly to methods for systematically verifying the correctness of a metadata upgrade.

The catalog of a database contains metadata that makes database objects self-descriptive. From time to time, it is necessary to modify objects or to change or update system privileges. When a new feature is created, the catalog may have new tables or columns to store the new object information. The representation of the object might also change in a new release. In these situations, the existing catalog representation must be transformed into a new form during a database upgrade, which is a process that transforms old catalog metadata into a new format.

Following a transformation, it is desirable to identify any change in the catalog and also to verify that the transformation of the catalog was correct. If particular operations were done on an old database to upgrade it, and the same operations are performed on a freshly initiated database, the two systems should behave substantially the same. From a user's perspective, this means that the semantics of the database systems should be identical.

A common way to test an upgrade is to perform sample tests on a database to determine whether it runs correctly. This approach, however, is not systematic and may frequently miss incorrect transformations and other problems. It is desirable to provide methods for systematically verifying the correctness of database metadata upgrades that are convenient and easy to use and that can provide both fast overall testing as well as complete and thorough testing to detect incorrect transformations. It is to these ends that the present invention is directed.

DESCRIPTION OF PREFERRED EMBODIMENTS

The invention may be employed with different types of both distributed and non-distributed database systems. It is particularly well adapted to a distributed database architecture, and will be described in that context. However, as will be appreciated, this is illustrative of only one utility of the invention.

Figure 1:
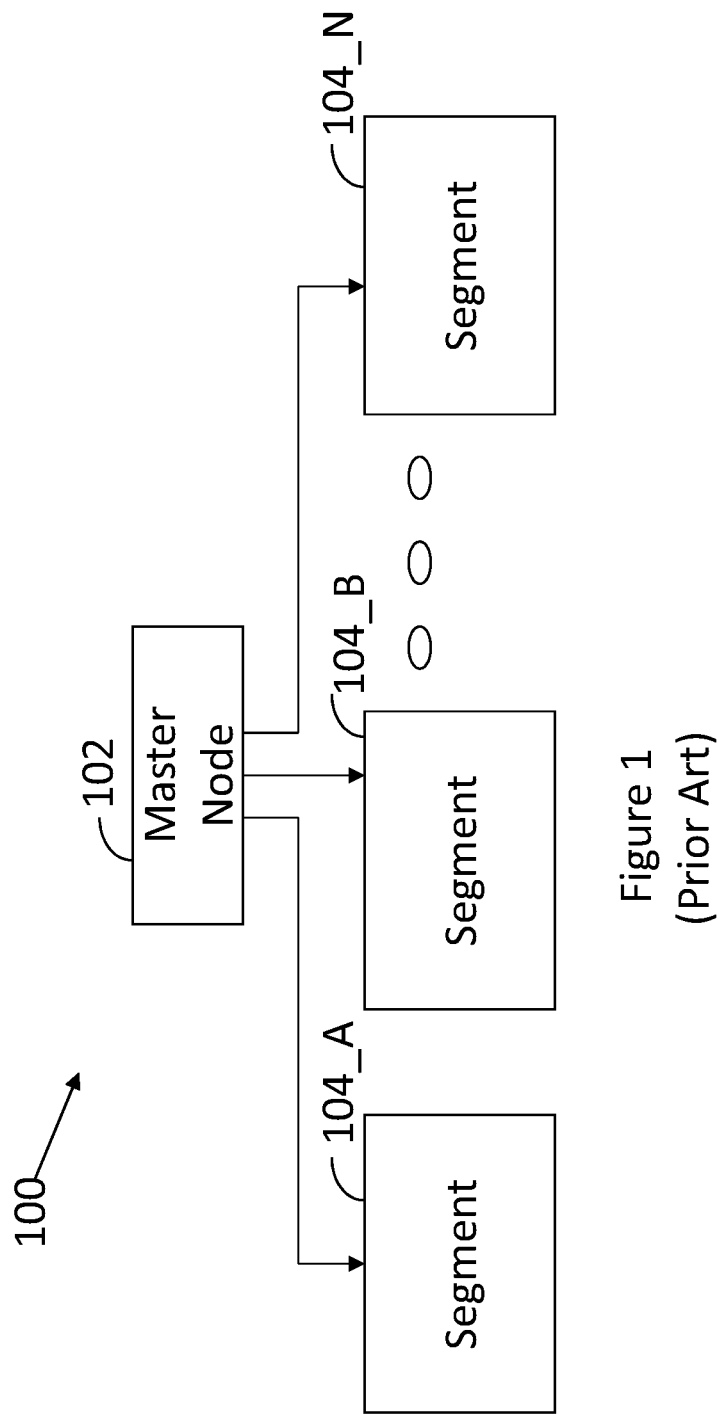
FIG. 1 is a block diagram of one type of distributed database system with which the invention may be employed.

FIG. 1 illustrates the architecture of one type of a logical distributed database system 100 of an enterprise with which the invention may be employed. The database may include a master node 102 which connects to a plurality of segment nodes 104_A through 104_N. Each segment node may comprise one or more database (DB) segments (database instances), including one or more primary databases and one or more mirror databases. For fault tolerance purposes, a primary database segment and its corresponding mirror database segment may be located on different nodes. The master and segment nodes may comprise generally similar server applications having the same process model as a standalone server that is augmented with extensions for a distributed system, such as data distribution, remote process communications, and data replication between primary-mirror pairs.

Figure 2:
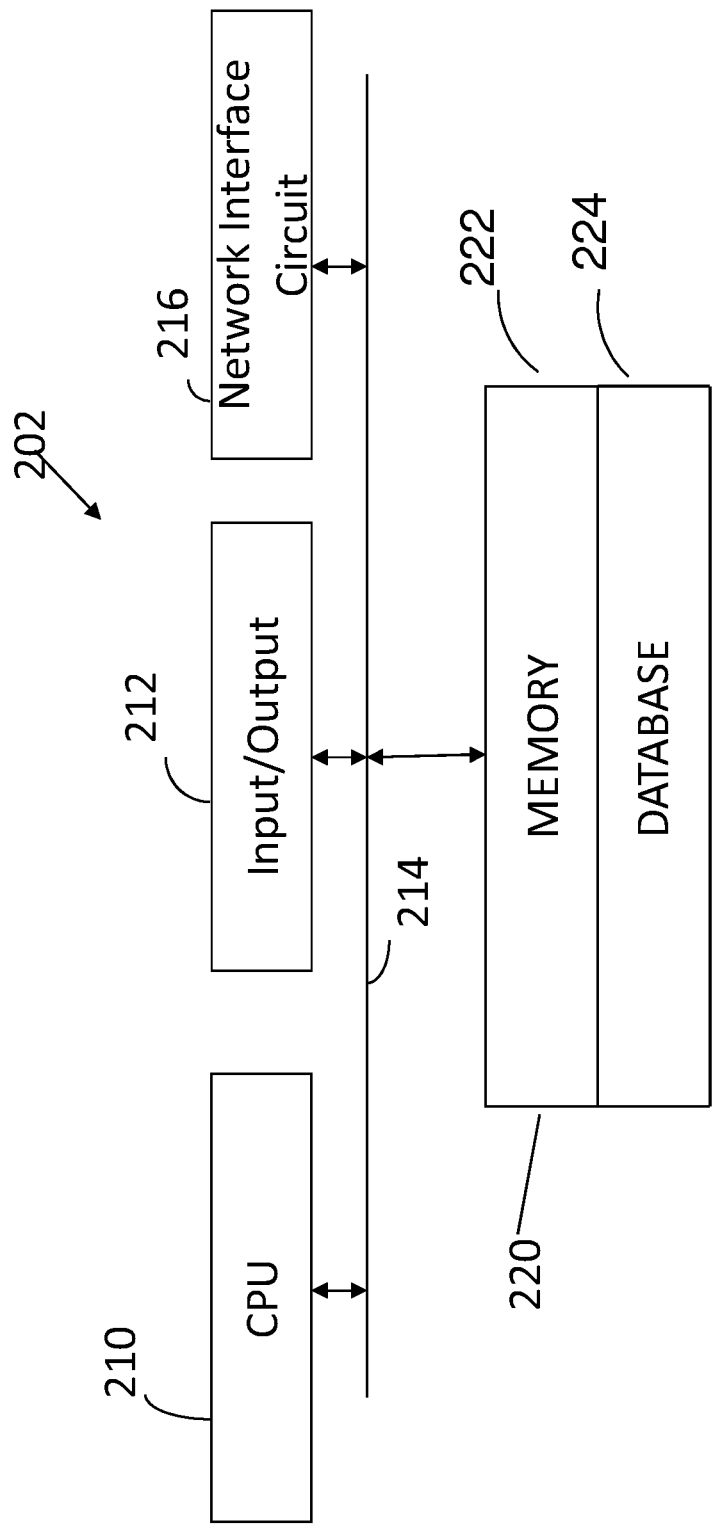
FIG. 2 is a block diagram illustrating a node of the database system of FIG. 1.

FIG. 2 illustrates an example of the architecture of a master node 202 of the database system that is configured to perform processes and operations in accordance with the invention. The master node and the segment nodes may have substantially the same architectures. The master node 202 may comprise a host computer server system 210 (which may comprise a single CPU or may be a multi-processor system comprising a plurality of CPUs) connected to input/output (I/O) devices 212 by a bus 214. The I/O devices may be standard computer system input and output devices. A network interface circuit 216 may also be connected to bus 214 to allow the master node to operate in the networked environment of the database of FIG. 1. The master node may further have storage 220 comprising non-transitory physical storage media connected to the bus that embodies executable instructions to control the operations of the computer system. Storage 220 may include a main memory 222 comprising instructions that control the CPU to operate in accordance with the invention, as will be described, and may contain other storage 224 for storing a database and a database catalog. The catalog in a database, as is well known, stores, among other things, metadata describing the logical attributes of database objects, serves as an index to the actual database user data, and stores tables of users and privileges that are used for controlling access to the database and permissible actions.

As described above, when a database system is upgraded to incorporate new elements or to change existing objects, the database system catalog must also be transformed during the upgrade to transform old metadata into a new form. During the upgrade it is necessary to identify changes to the catalog and to verify that the transformation of the catalog is correct. As will be described, the invention provides flexible hybrid verification testing that affords different testing strategies which may be employed during different stages of the upgrade process to verify that the upgraded transformed catalog is correct. In a first embodiment, an upgrade testing method which is referred to herein as a "dump and compare" process, comprises a course-grained approach that affords summary testing that is intended to detect a number of predetermined commonly encountered errors. This testing method is fast, easy to run, does not require any special setup, and every developer can run it. It is useful, for instance, to enable a developer to check new code before it is committed.

A second embodiment, which is referred to as "row-by-row" verification testing, is a fine-grained verification testing method that is more comprehensive, thorough and complete. It can, for instance, detect errors that are related to the logical definition of an object that the dump and compare testing approach will not detect. It requires more setup than the dump and compare approach which an ordinary developer may be unable to do or wish not to do, and it requires longer to execute. The row-by-row testing approach is, therefore, more useful during system integration testing.

Figure 3:
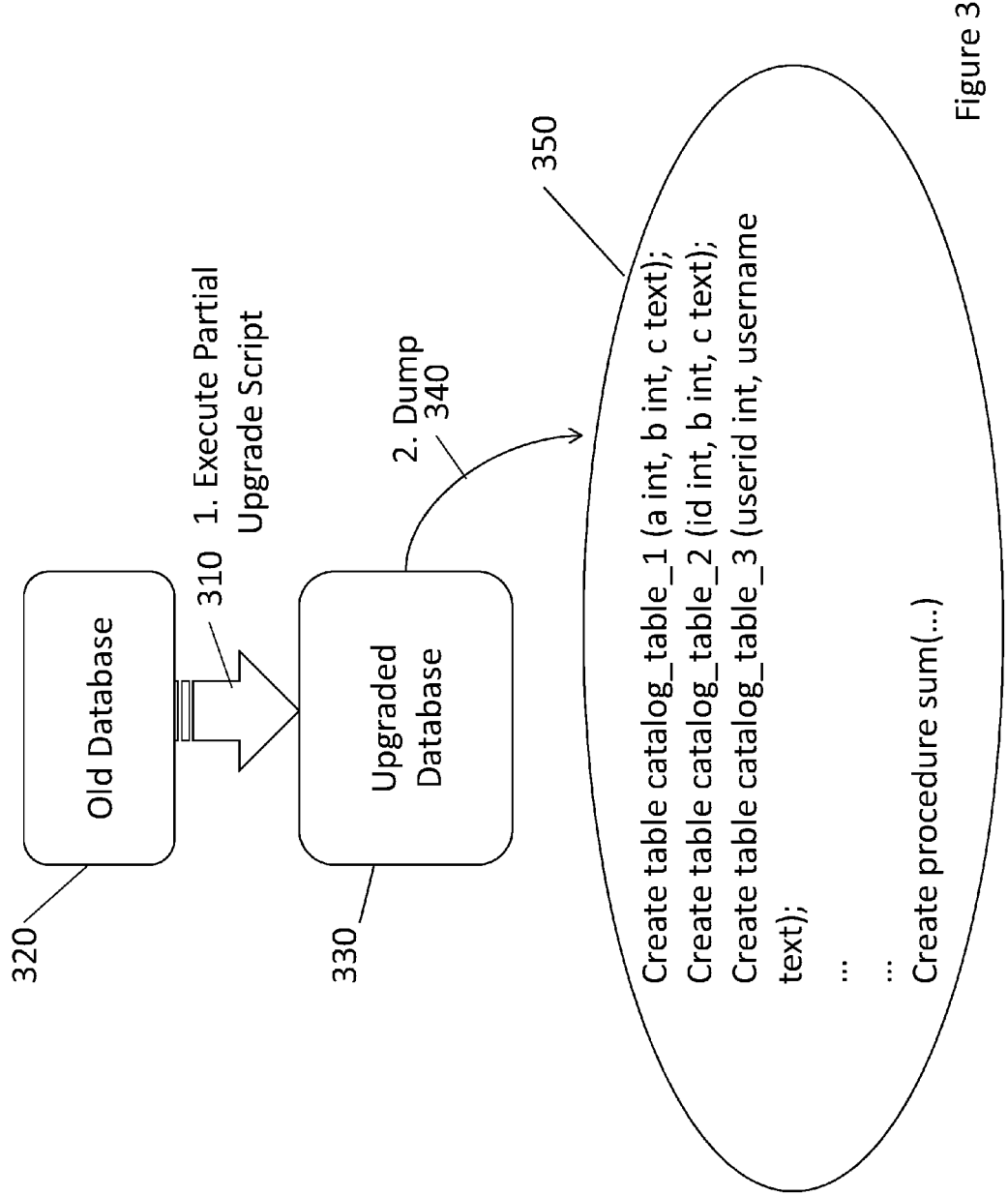
FIGS. 3 and 4 are diagrammatic views that illustrate a first embodiment of the invention for course-grained verification testing of the correctness of an transformed database catalog with respect to a newly initiated database catalog.
Figure 4:
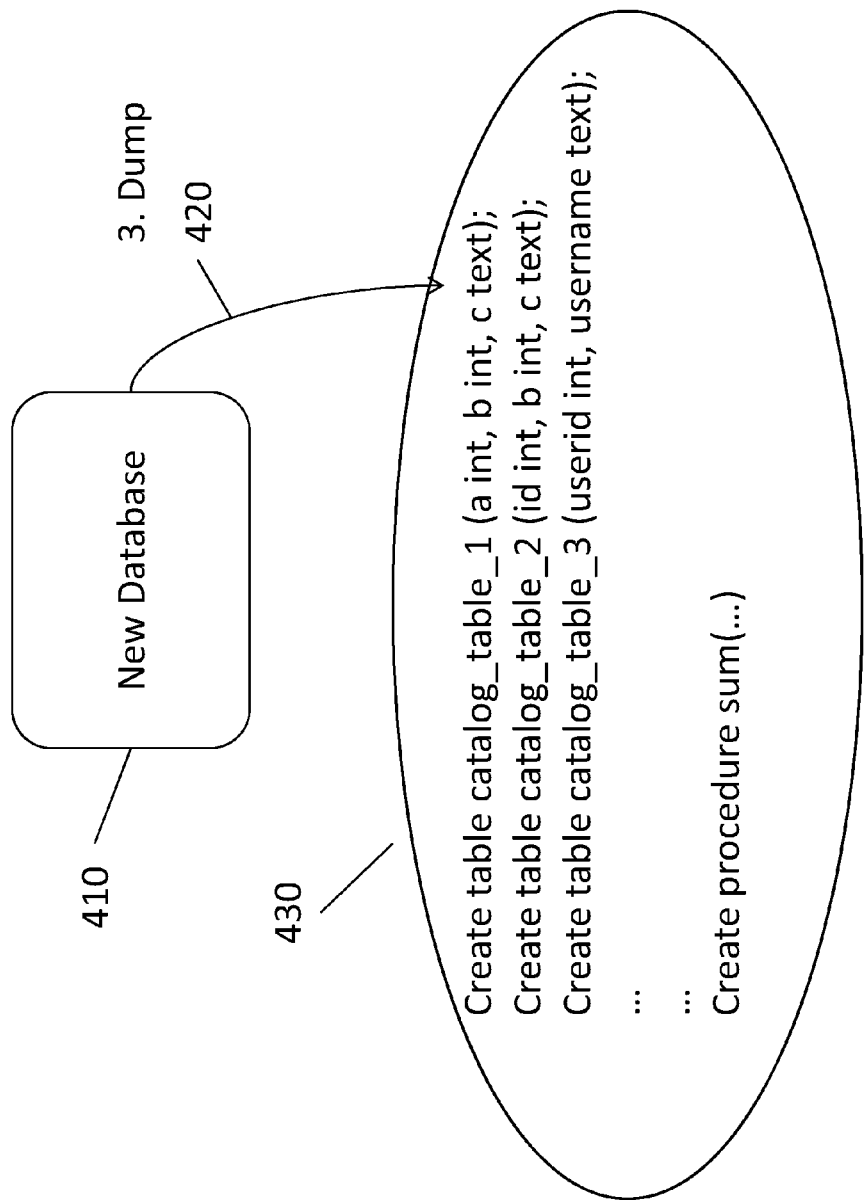

FIGS. 3 and 4 illustrate the first dump and compare embodiment of the invention. Referring to FIG. 3, a partial upgrade script 310 is first run on an existing database 320 that is to be upgraded. This partial upgrade script which may include a workflow such as creating a set of tables T1, T2 and T3, for example, transforms catalog of the database 320 to produce an upgraded database 330. The partial upgrade script may comprise DDL (data definition language) statements which may be executed easily by developers without any special setup, and preferably capture relevant catalog changes. Next, a dump of the catalog objects is performed at 340 on the master node 102, 202 catalog of the upgraded database 330. A dump is a process that captures and copies information in the catalog and outputs the information as a DDL flat text file 350. A dump may be implemented in ways well known to those skilled in the art. As shown in FIG. 3, the text file 350 may contain a list of the workflow statements that created the set of tables T1, T2 and T3. Text file 350 may be temporarily stored.

Next, referring to FIG. 4, a new database 410 corresponding to upgraded database 330 may be created and initialized by installing the binaries and the system tables into its catalog. The catalog of the master node of the new database 410 may be then dumped at 420 to produce a second flat text file 430 of DDL statements, as shown in the figure. The two text files 350 and 430 should be identical if the database upgrade was performed correctly. To verify this, the text files may be compared to detect any differences. The comparison may be performed on a bit-by-bit basis, for example, by using a utility such as Linux DIFS, for example, and that preferably masks any unwanted or unimportant data in the catalog dumps.

The dump and compare verification testing illustrated in FIGS. 3 and 4 is a course-grained approach in that not all data in the catalog is verified. Certain information in the catalog is not captured by the DDL statements such as, for example, object IDs. This method only performs dump on the catalog of the master node and not on the catalogs of the segment nodes. The advantage of this approach is that it may be executed very quickly and easily, as when a developer installs code changes, and it can be used to detect certain selected types of problems in a partial database upgrade script, such as missing a create table statement.

Figure 5:
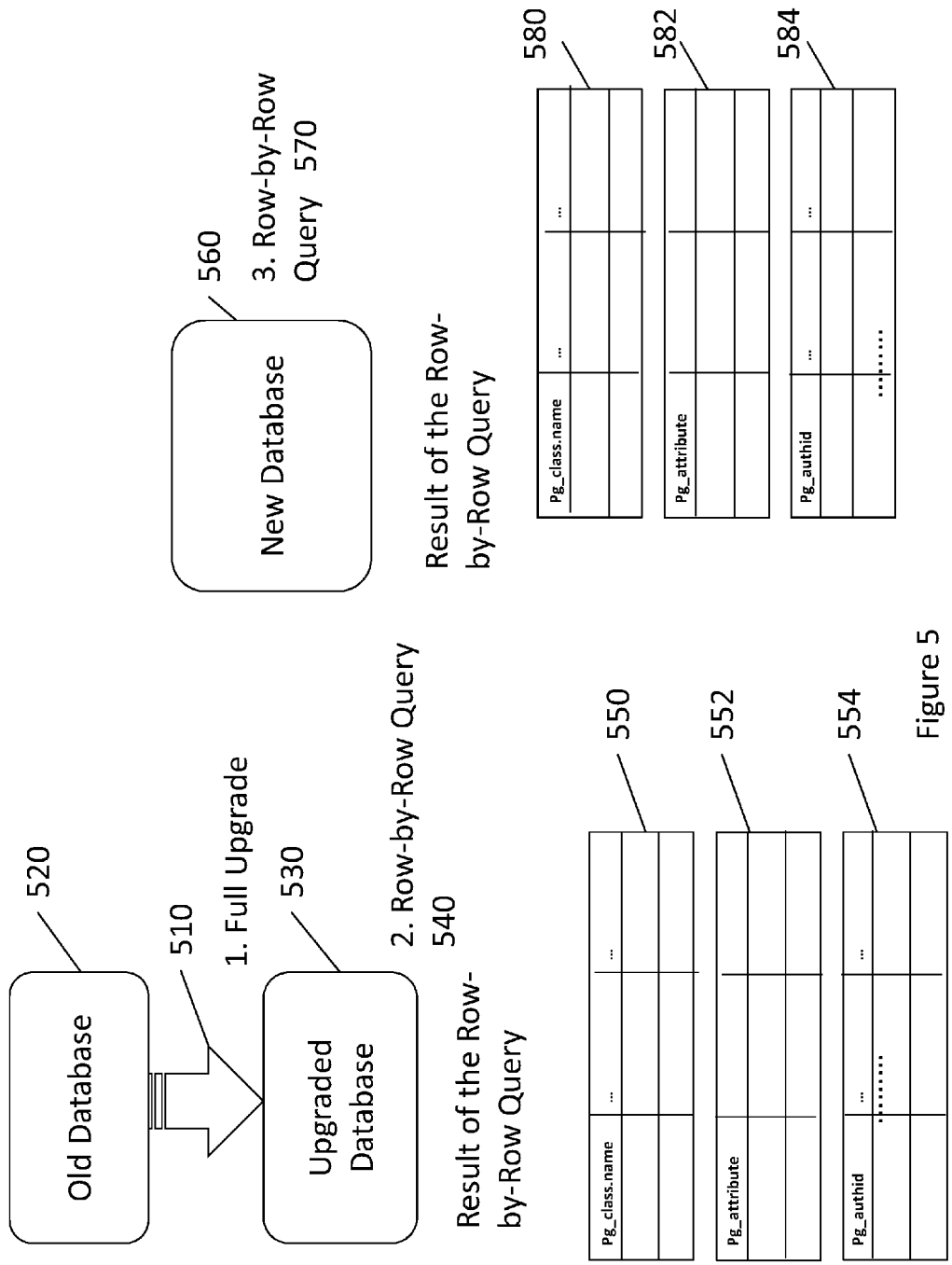
FIG. 5 is a diagrammatic view that illustrates a second embodiment of the invention for fine-grained verification testing of the correctness of a transformed database catalog with respect to a newly initiated database catalog using row-by-row queries of the database catalogs.

FIG. 5 is an overview of an embodiment of a fine-grained method for verifying the correctness a database upgrade. It is referred to herein as a row-by-row verification method. Unlike the dump and compare verification method described above, as will be appreciated, the row-by-row verification method affords more comprehensive and thorough verification testing, but it requires a more complex setup and takes longer to run. It can be used to verify the correctness of a full database upgrade, and can verify the correctness of not only the master catalog, but also the segment catalogs. Thus, the row-by-row verification method is well suited for use during integration testing, although it may be used also at other times.

Referring to FIG. 5, a database upgrade 510 may be fully performed on an old database 520 to transform the old database into an upgraded database 530. Next, a plurality of queries of the logical attributes of the upgraded database may be executed the upgraded database catalog at 540 to capture all the relevant rows. A large number of different queries may be employed, e.g., 50 or more, and they may be constructed to query each row of all the catalog tables to detect predetermined information about the database objects. The results produced by each query may be in the form of a flat text file. The figure shows examples of three such text files 550, 552, and 554 resulting from three row-by-row queries on the upgraded database.

Next, the same plurality of queries as 540 may be run at 570 on the newly initialized database 560, to produce corresponding flat text files. The figure shows examples of three such flat text files 580, 582 and 584 that correspond to the results of the same three queries that produced flat text files 550, 552 and 554 for the upgraded database 530. The corresponding pairs 550-580, 552-582, and 534-584 of text files produced by the queries may be compared bit-by-bit in a manner similar to that described above for the dump and compare testing method to detect any differences in the text files and to verify the correctness of the upgrade.

There are substantial differences between the course-grained dump and compare verification method of FIGS. 3 and 4 and the fine-grained row-by-row verification method of FIG. 5. The methods produce different types of results and are useful for different purposes.

Figure 6:
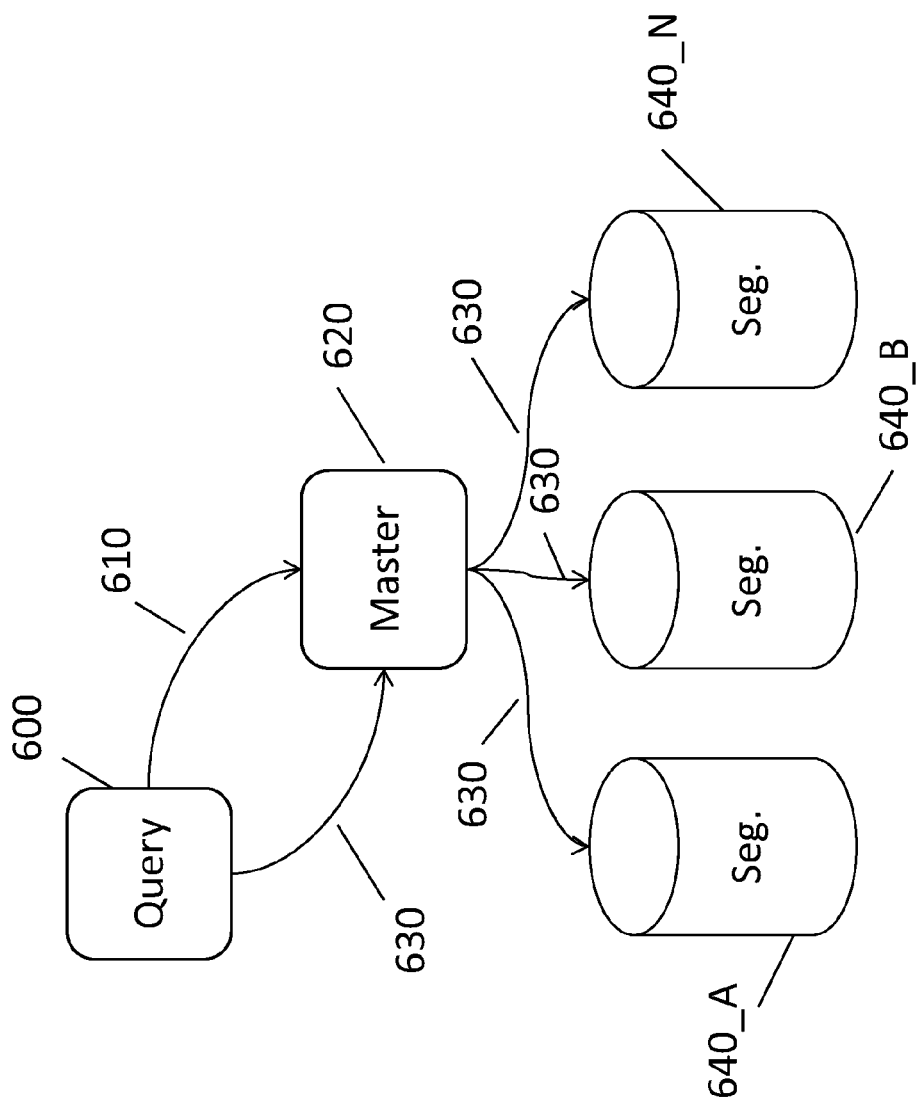
FIG. 6 is a diagrammatic view that illustrates an overview of the query processes of the verification method of FIG. 5.

Referring to FIG. 6, the row-by-row queries 600 described above in connection with FIG. 5 may be first executed at 610 on the catalogs of the master nodes 620 of the upgraded and new databases, respectively, and the results of these queries comprising separate flat files as described above may be compared to detect any differences between the catalogs of the two master nodes to verify the correctness of the upgrade. Next, since the master catalogs are replicated on each of the segments of the database system, the same set of queries may be run at 630 as a distributed query on each of the various segments 640_A, 640_B and 640_N of the upgraded databases. The flat file results of the queries on the segments also may be compared, as described above, to detect any differences between the segments and to verify the correctness of the upgrade. Thus, in the row-by-row testing method, the catalogs of the master node of the upgraded database and the new database are compared to one another, and the catalogs of the segment nodes of the upgraded database and the databases are compared.

Figure 7:
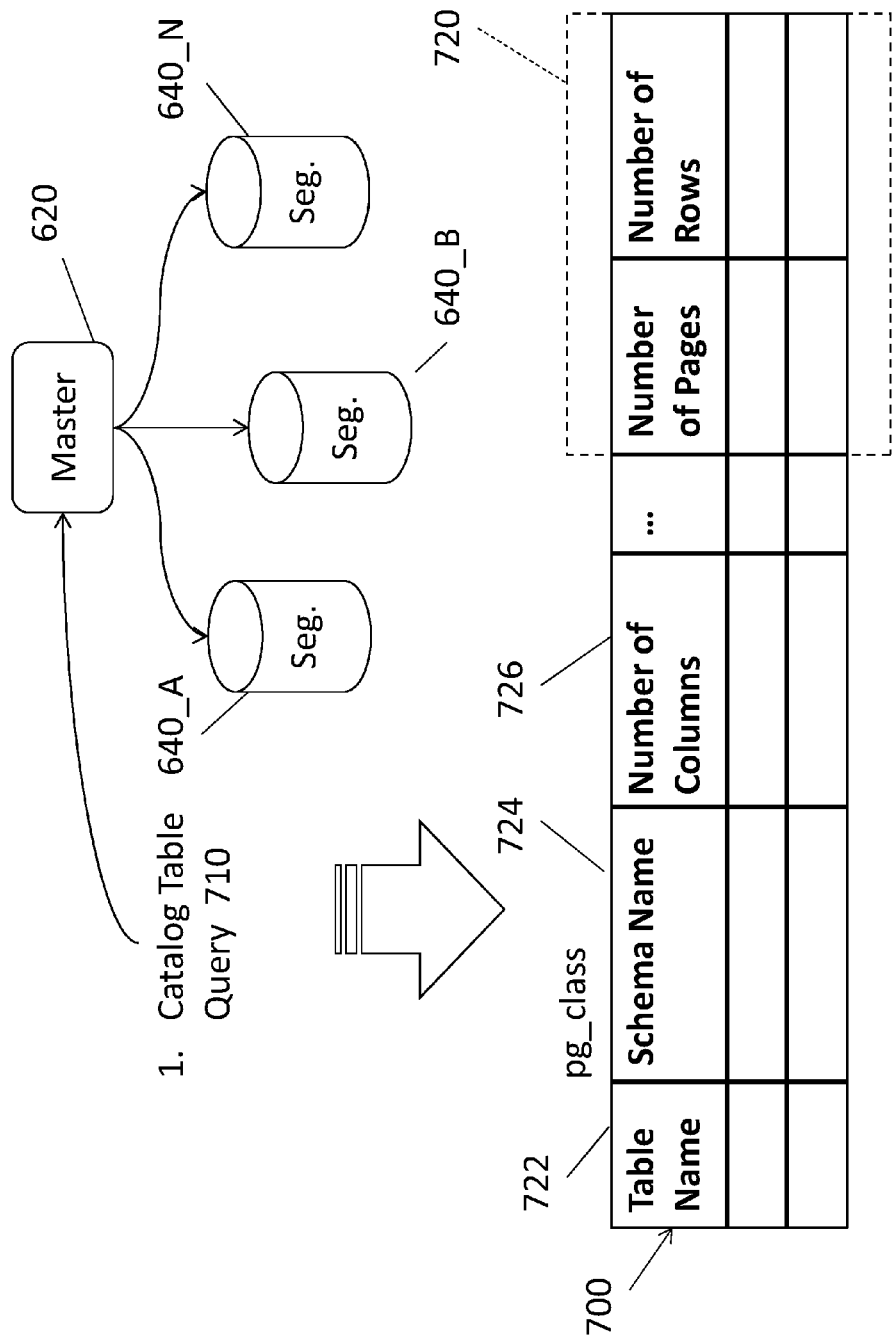
FIG. 7 is a diagrammatic view that illustrates more details of the verification testing process of FIG. 5.

FIG. 7 illustrates in more detail the result of a query of the row-by-row verification testing method. As noted above, this approach determines the correctness of a database upgrade by considering only the logical attributes of database objects. Logical attributes comprise logical information about those attributes or elements of an object which are necessary for a logical representation of the object, as opposed to a physical representation of the object, such as where it is stored. As result, some of the information produced by a query is not relevant to verify correctness and can be disregarded in comparing results.

FIG. 7 illustrates the results 700 of an exemplary query 710 on a master node 620 or a segment node 640_A-640_N of the database system. Certain information in the results, such as columns 720 related to the number of pages and the number of rows, are not logical attributes of interest since they have nothing to do with the catalog table definition. Accordingly, this information can be masked off in comparing results. On the other hand, information in the other columns 722, 724, 726, etc., pertaining to table name, schema name and number of columns, for example, is related to the logical attributes of the object and is preferably included in the comparison.

From the foregoing, it will be appreciated that the invention advantageously provides flexible verification testing of database upgrades that affords fast, summary testing that is useful for partial upgrades and that developers can run quickly and easily to detect major errors before checking in any code, and more thorough and comprehensive integration testing of full upgrades that can verify the correctness of upgrades on both master and segment catalogs of a distributed database.

While the foregoing description has been with reference to particular embodiments of the invention, it will be appreciated by those skilled in the art that modifications to these embodiments may be made without departing from the principles and spirit the invention, the scope of which is defined by the appended claims.

What is claimed is:

1. A method for verifying a distributed database system upgrade, comprising:
   upgrading a first database system to produce an upgraded database system comprising a master node, a plurality of segment nodes, and a master node catalog;
   executing a set of queries on metadata in said master node catalog to produce a first file containing first information about logical attributes of database objects of said upgraded database system, said first file excluding information contained in said master node catalog that is unrelated to said logical attributes of database objects of said upgraded database system;
   initializing a new database system corresponding to said upgraded database system, the new database system having a new master node, a plurality of new segment nodes, and a new master node catalog;
   executing the same set of said queries on metadata in said new master node catalog to produce a second file containing information about second logical attributes of database objects of said new database system, said second file excluding information contained in said new master node catalog that is unrelated to said second logical attributes of database objects;
   first comparing the first and second files for an initial verification of said new database system;
   replicating said new master node catalog on said plurality of new segment nodes of said new database system;
   executing said same set of queries on metadata in a segment catalog of each of said plurality of new segment nodes, the segment catalog containing information about logical attributes of database objects of said segment, to produce a plurality of corresponding segment result files that exclude information unrelated to such logical attributes; and
   second comparing each of the plurality of segment result files with said second file to produce a second verification of said new database system.

2. The method of claim 1, wherein said first, second and segment result files each comprise flat text files having a plurality of rows, and said first and second comparing comprise comparing said files row-by-row to detect differences between logical attributes of database objects.

3. The method of claim 2, wherein said first comparing and second comparing comprise comparing said text files bit-by-bit to detect any differences.

4. The method of claim 1, further comprising dumping the metadata in of the master node catalog of said upgraded database to produce a first dump file, dumping the metadata of the new master node catalog of said new database to produce a second dump file, and comparing said first and second dump files to verify the correctness of the upgrade.

5. The method of claim 4, further comprising masking off information unrelated to logical attributes of said catalogs, and wherein said comparing said first and second dump files comprises comparing said first and second dump files bit-by-bit to detect differences.

6. Computer readable non-transitory storage medium for storing instructions for controlling the operation of a computer for verifying a distributed database system upgrade, comprising instructions for:
   upgrading a first database system to produce an upgraded database system comprising a master node, a plurality of segment nodes, and a master node catalog;
   executing a set of queries on metadata in said master node catalog to produce a first file containing first information about logical attributes of database objects of said upgraded database system, said first file excluding information contained in said master node catalog that is unrelated to said logical attributes of database objects of said upgraded database system;
   initializing a new database system corresponding to said upgraded database system, the new database system having a new master node, a plurality of new segment nodes, and a new master node catalog;
   executing the same set of said queries on metadata in said new master node catalog to produce a second file containing information about second logical attributes of database objects of said new database system, said second file excluding information contained in said new master node catalog that is unrelated to said second logical attributes of database objects;
   first comparing the first and second files for an initial verification of said new database system;
   replicating said new master node catalog on said plurality of new segment nodes of said new database system;
   executing said same set of queries on metadata in a segment node catalog of each of said plurality of new segment nodes, the segment node catalog containing information about logical attributes of database objects, to produce a plurality of corresponding segment result files that exclude information unrelated to such logical attributes; and
   second comparing each of the plurality of segment result files with said second file to produce a second verification of said new database system.

7. Computer readable medium of claim 6, wherein said first, second and segment result files each comprise flat text files having a plurality of rows, and said first and second comparing comprises comparing said files row-by-row to detect differences between logical attributes of database objects.

8. Computer readable medium of claim 7, wherein said first comparing and second comparing comprise comparing said text files bit-by-bit to detect any differences.

9. Computer readable medium of claim 6, further comprising instructions for dumping the metadata of the master node catalog of said upgraded database to produce a first dump file, instructions for dumping the metadata of the new master node catalog of said new database to produce a second dump file, and instructions for comparing said first and second dump files to verify the correctness of the upgrade.

10. Computer readable medium of claim 9, further comprising instructions for masking off information unrelated to logical attributes of said catalogs, and said instructions for comparing said first and second dump files comprising instructions for comparing said first and second dump files bit-by-bit to detect differences.

* * * * *